US011991999B2

(12) United States Patent
Shirland, Jr. et al.

(10) Patent No.: US 11,991,999 B2
(45) Date of Patent: May 28, 2024

(54) DOWNRIGGER PEDESTAL

(71) Applicants: Frederick L. Shirland, Jr., Old Town, ME (US); Jeffery J. Shirland, Hermon, ME (US)

(72) Inventors: Frederick L. Shirland, Jr., Old Town, ME (US); Jeffery J. Shirland, Hermon, ME (US)

( * ) Notice: Subject to any disclaimer, the term of this patent is extended or adjusted under 35 U.S.C. 154(b) by 420 days.

(21) Appl. No.: 17/390,547

(22) Filed: Jul. 30, 2021

(65) Prior Publication Data
US 2023/0036731 A1 Feb. 2, 2023

(51) Int. Cl.
*A01K 91/08* (2006.01)
*B63B 17/00* (2006.01)

(52) U.S. Cl.
CPC .............. *A01K 91/08* (2013.01); *B63B 17/00* (2013.01)

(58) Field of Classification Search
CPC . B63B 17/00; B63B 34/05; B63B 2017/0054; B63B 29/06; A01K 91/08; A01K 97/10; E04H 12/2253; E04H 12/2261; E04H 12/2269; E04H 17/21; A47G 29/1216; F16M 2200/08
See application file for complete search history.

(56) References Cited

U.S. PATENT DOCUMENTS

| 160,574 | A | * | 3/1875 | Cornell | ............... | E04H 12/2269 |
| | | | | | | 52/298 |
| 4,156,320 | A | * | 5/1979 | Kammeraad | .......... | A01K 91/08 |
| | | | | | | 242/399.2 |
| 5,362,019 | A | * | 11/1994 | Swanson | ............ | A47G 29/1216 |
| | | | | | | 232/39 |
| 7,137,222 | B2 | * | 11/2006 | Aanenson | .............. | A01K 91/08 |
| | | | | | | 43/42.31 |
| 8,317,226 | B1 | * | 11/2012 | Wong | .................. | E04H 12/2261 |
| | | | | | | 280/769 |
| 9,493,962 | B2 | * | 11/2016 | Eddy | .................... | E04H 12/2261 |
| 2012/0272890 | A1 | * | 11/2012 | Henke | .................... | A01K 97/10 |
| | | | | | | 114/364 |
| 2015/0216157 | A1 | * | 8/2015 | Flanagan | ............... | A01K 97/10 |
| | | | | | | 248/512 |

* cited by examiner

*Primary Examiner* — Ajay Vasudeva
(74) *Attorney, Agent, or Firm* — Anthony D. Pellegrini (57) ABSTRACT

A pedestal for mounting a downrigger fishing device to the deck of a watercraft, with the pedestal having a support post, a base plate, a mounting plate, one or more reinforcing members, and one or more securing plates.

34 Claims, 5 Drawing Sheets

DOWNRIGGER PEDESTAL

BACKGROUND OF THE INVENTION

A downrigger is a device used while fishing from a watercraft, using the trolling method. The downrigger places and maintains a lure and or bait at a desired depth as the watercraft slowly moves about, by attaching a significant weight to the end of a cable which carries a hook to the desired depth. A downrigger typically consists of a "boom" (or pole), which may be between three to six feet long (though other lengths may be used), a "cannonball" (the weight), generally between 5 to 25 pounds, and a steel cable. It also has a means for attaching a fishing rod. A short, detachable line connects the cannonball to the end of the fishing line from the fishing rod. When a fish strikes the lure/bait at the end of the fishing line, the fishing line detaches from the cannonball and the fish can be reeled in using the fishing rod. Within the downrigger itself, there is spool used to take up the cable; the spool may be manually turned by use of a crank or turned by use of an electric motor.

Downriggers are popular for use in larger bodies of water at greater depths. The weight keeps the lure at a desired depth where fish are expected to be. Because of the multiple components of a downrigger, though, the combined weight tends to be significant, and a person using a downrigger therefore secures it to the watercraft. Typical downrigger mounts attach the device to a rail along the side of the watercraft, or at the stern. Rail mounted systems, however, only work on watercraft equipped with rails. In the absence of rails, a mount may be clamped directly to the gunwale or the transom of a watercraft, but such clamps must be customized to the specific design of the watercraft, and the clamping mechanism may not hold strongly enough to properly secure the heavy downrigger device. Other systems attach a short mount to the deck of a watercraft. These mounts can attach to any watercraft with a deck, but due to their short height they can only be used with watercraft having relatively short sides. These deck mounts are kept short to avoid the excess torqueing forces that the heavy downrigger components would exert on a taller mount, potentially pulling the mount out of the deck. However, the recent popularity of pontoon boats for fishing precludes the use of short deck mounts, because of the tall sides typically found on pontoon boats.

What has been described demonstrates a need for an improved mounting system for downriggers that can be used on tall sided watercraft without losing stability or becoming dislodged from the deck of the watercraft.

It is therefore an object of the present invention to provide a pedestal for mounting a downrigger that can be used on tall sided watercraft.

It is a further object of the present invention to provide a pedestal for mounting a downrigger that is tall enough to position the downrigger for use with pontoon boats.

It is yet a further object of the present invention to provide a pedestal for mounting a downrigger that uses an offset base plate for attachment to the deck of a watercraft to better distribute torqueing forces, keeping the pedestal secured to the deck of a watercraft.

It is yet a further object of the present invention to provide a pedestal for mounting a downrigger that is easy to manufacture.

Other objects of the present invention will be readily apparent from the description that follows.

SUMMARY OF THE INVENTION

The present invention is a pedestal for supporting a downrigger on the deck of a watercraft. The pedestal is comprised of a support post which is tall enough to be used with watercraft having high sides, such as pontoon boats. The pedestal is further comprised of an offset base plate that attaches the support post to the deck. The support post is attached to the base plate in a manner that allows for an extended portion of the base plate to extend towards the portion of the watercraft over which the downrigger is to be deployed (for example, towards the stern if the downrigger is deployed over the transom). As such, the torqueing forces distributed to the base plate are spread over a greater area in the direction of the application of the force, thereby reducing the pivoting potential of the support post and minimizing the risk of the base plate pulling out of the deck. Reinforcing members are placed adjacent to the support post and base plate to further strengthen the pedestal. Securing plates are used below the deck of the watercraft, with attachment fasteners passing through the base plate, the deck, and the securing plates. This is especially useful for securing the pedestal to the deck of a pontoon boats, where the underside of the deck is readily accessible. Finally, a mounting plate is affixed to the top of the support post, onto which the downrigger may be attached using mounting fasteners.

The components of the pedestal of the present invention are readily assembled by placing the major components together and then securing them to each other by the use of welds. Other means can also be used to secure the components together, for example, high strength adhesives. In an alternative embodiment, use of apertures formed into the base plate assists in assembly, with the components fitting together through insertion into the apertures. In this embodiment, the base plate has an engagement aperture formed therethrough which accommodates the bottom portion of the support post, and the base plate has reinforcement apertures formed therethrough which accommodate the reinforcing members. Once inserted, the components are secured in place as described above.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims incorporated herein.

DETAILED DESCRIPTION OF THE INVENTION

Figure 1:
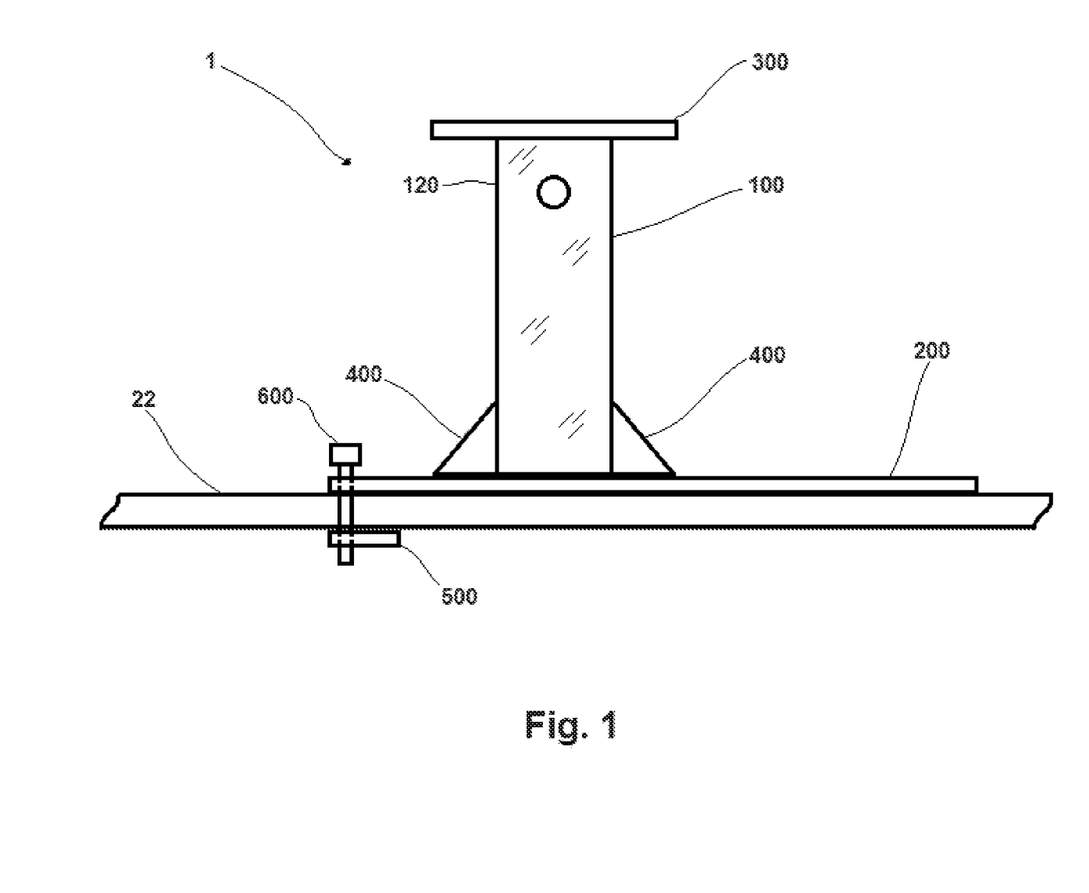
FIG. 1 is a plan side view of one embodiment of the device of the present invention.

In one aspect of the present invention, a pedestal 1 for supporting a downrigger 10 on a deck 22 of a watercraft 20 is disclosed. The pedestal 1 comprises a support post 100, a base plate 200, a mounting plate 300, and one or more reinforcing members 400. Optionally, one or more securing plates 500 may be incorporated to aid in securing the pedestal 1 to the deck 22. See FIG. 1.

Figure 3:
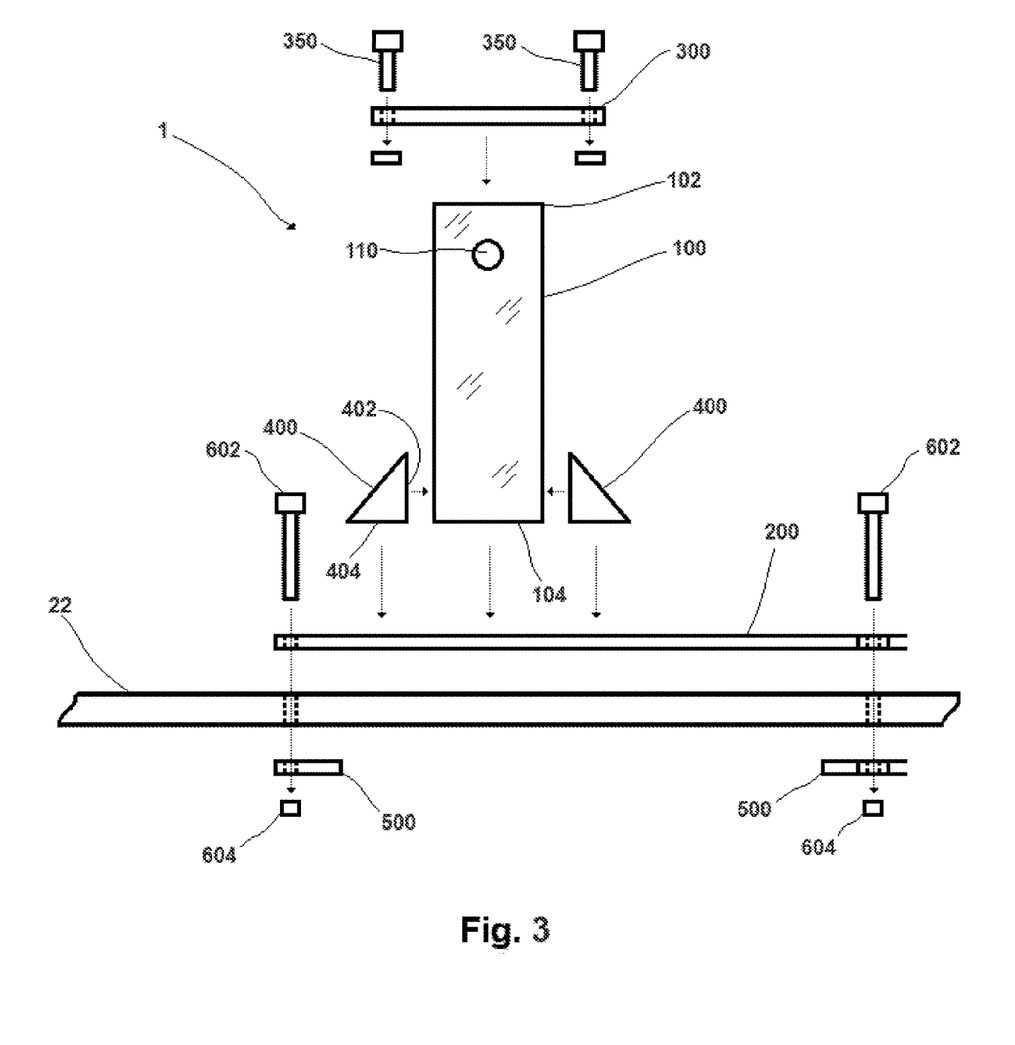
FIG. 3 is an exploded plan side view of the embodiment of the device shown in FIG. 1, with indicators of how the various components are put together.

The support post 100 is elongate and constructed of a rigid durable material and comprises a top portion 102, a bottom portion 104, and an internal void 110. In one embodiment, the support post 100 has a substantially circular cross section. In another embodiment, the support post 100 has a rectangular cross section. In yet another embodiment, the support post 100 has a square cross section. In the preferred embodiment, the support post 100 is constructed out of stainless steel. Other materials are also contemplated, such as aluminum, composites, steel, and the like. The support post 100 is mounted in a substantially vertical orientation, with its bottom portion 104 located proximate to the deck 22 of the watercraft 20 and its top portion 102 located opposite the bottom portion 104. The height of the support post 100 may vary as practical, with a preferred range of heights being between 18 inches and 30 inches, and the most preferred height being 24 inches. The diameter of the support post 100 also may vary as practical, with a preferred range of diameters being between 2 inches and 6 inches, and the most preferred diameter being 3 inches. The sides of the support post 100 have a thickness that may vary as practical, with a preferred range of thicknesses being between $1/16^{th}$ inch and 1 inch, and the most preferred thickness being $1/8^{th}$ inch. Optionally, the support post 100 may comprise an access aperture 120 passing completely through the side of the support post 100, to provide access to the internal void 110 of the support post 100. This allows wiring for the downrigger 10 to be placed through the access aperture 120 and within the internal void 110 of the support post 100. The access aperture 120 is preferably located on the top portion 102 of the support post 100. It may have any practical diameter, with the preferred diameter being 1 inch. See FIGS. 1 and 3.

Figure 2A:
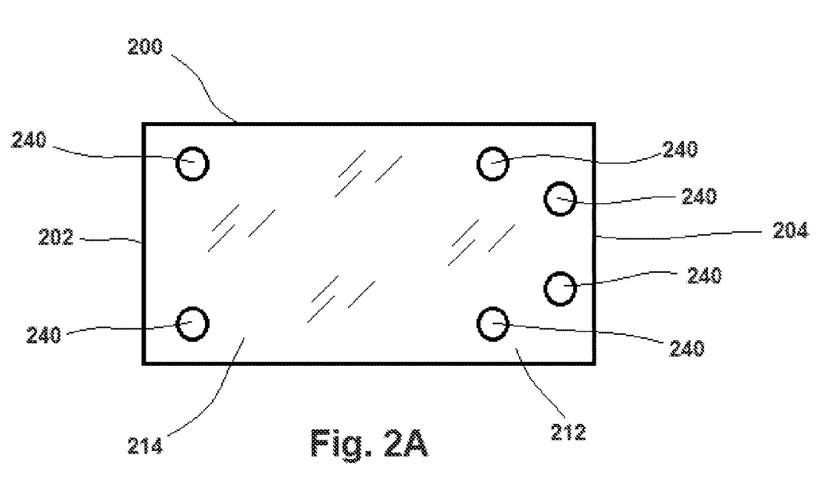
FIG. 2A is a plan top view of the base plate of the embodiment of the device shown in FIG. 1.

The base plate 200 is substantially planar and constructed of a rigid durable material. It comprises a first end 202, a second end 204, a first portion 212, a second portion 214, and a plurality of attachment apertures 240. In one embodiment, the base plate 200 has a substantially rectangular shape. In another embodiment, the base plate 200 has an ovoid shape. In other embodiments, the base plate 200 may have an irregular shape, as long as it has a longitudinal axis of greater length than its latitudinal axis. In the preferred embodiment, the base plate 200 is constructed out of stainless steel. Other materials are also contemplated, such as aluminum, composites, steel, and the like. The first end 202 of the base plate 200 is located opposite the second end 204 of the base plate 200 along the longitudinal axis of the base plate 200. The first portion 212 of the base plate 200 is located proximate to the first end 202 of the base plate 200 and the second portion 214 of the base plate 200 is located proximate to the second end 204 of the base plate 200. The second portion 214 of the base plate 200 is longer than the first portion 212 of the base plate 200. The base plate 200 is placed in a substantially horizontal orientation onto the deck 22 of the watercraft 20. The length of the base plate 200 as measured along its longitudinal axis may vary as practical, with a preferred range of lengths being between inches and 15 inches, and the most preferred length being 12 inches. The width of the base plate 200 as measured along its latitudinal axis may vary as practical, with a preferred range of widths being between 3 inches and 8 inches, and the most preferred width being 5 inches. The thickness of the base plate 200 may vary as practical, with a preferred range of thicknesses of between $1/8^{th}$ inch and 1 inch, and the most preferred thickness being $1/4^{th}$ inch. See FIG. 2A.

The plurality of attachment apertures 240 of the base plate 200 pass completely through the base plate 200. Each attachment aperture 240 is suitably configured to accommodate attachment fasteners 600 which attach the base plate 200 to the deck 22 of the watercraft 20. At least one attachment aperture 240 is located on the first portion 212 of the base plate 200 and at least one attachment aperture 240 located on the second portion 214 of the base plate 200. In the preferred embodiment, there are six attachment apertures 240 located on the base plate 200, with four attachment apertures 240 located on the first portion 212 of the base plate 200 and two attachment apertures 240 located on the second portion 214 of the base plate 200. See FIG. 2A.

Figure 2B:
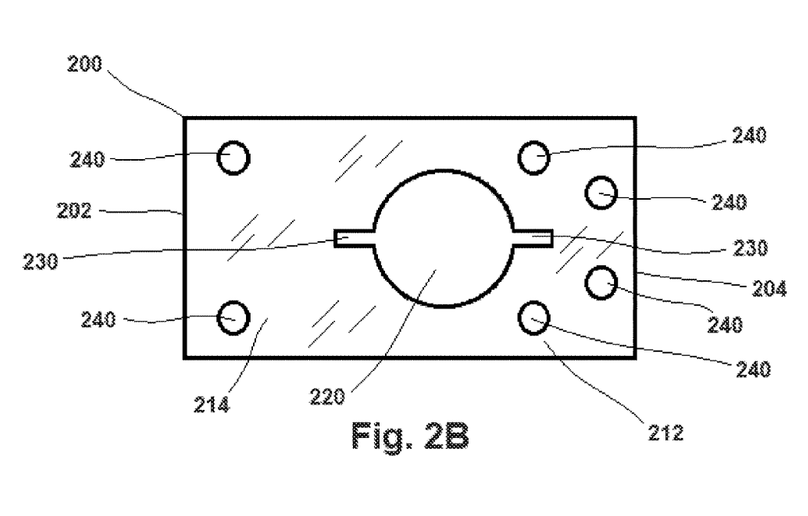
FIG. 2B is a plan top view of an alternate embodiment of the base plate.
Figure 2C:
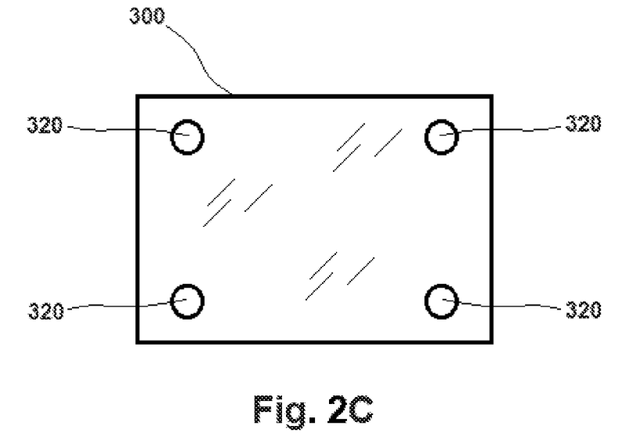
FIG. 2C is a plan top view of the mounting plate of the embodiment of the device shown in FIG. 1.

The mounting plate 300 is substantially planar and constructed of a rigid durable material. It comprises a plurality of mounting apertures 320. In one embodiment, the mounting plate 300 has a substantially rectangular shape. In another embodiment, the mounting plate 300 has an ovoid shape. In yet another embodiment, the mounting plate 300 has a circular shape. In the preferred embodiment, the mounting plate 300 has a substantially square shape. In other embodiments, the mounting plate 300 may have an irregular shape. In the preferred embodiment, the mounting plate 300 is constructed out of stainless steel. Other materials are also contemplated, such as aluminum, composites, steel, and the like. The mounting plate 300 is placed in a substantially horizontal orientation onto the top portion 102 of the support post 100. See FIGS. 1 and 3. The dimensions of the mounting plate 300 may vary as practical, with a preferred range of lengths and widths being between 3 inches and 8 inches, and the most preferred length and width each being 5 inches. The thickness of the mounting plate 300 may vary as practical, with a preferred range of thicknesses of between $1/8^{th}$ inch and 1 inch, and the most preferred thickness being $1/4^{th}$ inch. See FIG. 2C.

The plurality of mounting apertures 320 of the mounting plate 300 pass completely through the mounting plate 300. Each mounting aperture 320 is suitably configured to accommodate mounting fasteners 350 which attach the downrigger 10 to the mounting plate 300. In the preferred embodiment, there are four mounting apertures 320 located on the mounting plate 300. See FIG. 2C.

Each of the one or more reinforcing members 400 is substantially planar and constructed of a rigid durable material. In the preferred embodiment, the one or more reinforcing members 400 are constructed out of stainless steel. Other materials are also contemplated, such as aluminum, composites, steel, and the like. The bottom of each reinforcing member 400 is configured to fit onto the base plate 200. A side of each reinforcing member 400 is configured to be positioned against a side of the support post 100. In one embodiment, each of the one or more reinforcing members 400 is substantially triangular in shape, having a first side 402 and a second side 404 oriented substantially perpendicular to the first side 402, with the first side 402 being positioned adjacent to the support post 100 and the second side 404 positioned onto the base plate 200. See FIGS. 1 and 3.

The base plate 200 may optionally comprise an engagement aperture 220. The engagement aperture 220 passes through the base plate 200. It is sized and dimensioned to accommodate the bottom portion 104 of the support post 100. Therefore, if the support post 100 has a circular cross section, the engagement aperture 220 will be circular, and will be sized to have an inner diameter just slightly larger than the outer diameter of the support post 100. This results in a snug fit with tight tolerances. Where the support post 100 has a rectangular cross section, the engagement aperture 220 will likewise be rectangular, with an inner length and inner width just slightly larger than the outer length and outer width of the support post 100, again resulting in a snug fit with tight tolerances. Where the support post 100 has a square cross section, the engagement aperture 220 will likewise be square, with the inner sides just slightly larger than the outer sides of the support post 100, again resulting in a snug fit with tight tolerances. The engagement aperture 220 is located closer to the first end 202 of the base plate 200 than to the second end 204 of the base plate 200, between the first and second portions 214 of the base plate 200, and is substantially centered within the width of the base plate 200. See FIG. 2B.

The base plate 200 may optionally comprise one or more reinforcement apertures 230. The one or more reinforcement apertures 230 pass through the base plate 200. Each is sized and dimensioned to accommodate one of the one or more reinforcing members 400. Each reinforcement aperture 230 is located proximate to where the support post 100 sits on the base plate 200, with at least one reinforcement aperture 230 located on the second portion 214 of the base plate 200. In the preferred embodiment, each of the one or more reinforcement apertures 230 is an elongate slot oriented substantially perpendicular to the support post 100. In the most preferred embodiment, there are two reinforcement apertures 230, with one located on the first portion 212 of the base plate 200 and the other located on the second portion 214 of the base plate 200, with the two reinforcement apertures 230 being substantially collinear with each other. See FIG. 2B.

The above-described components are assembled into the pedestal 1 as follows: the bottom portion 104 of the support post 100 is placed onto the base plate 200 at a location closer to the first end 202 of the base plate 200 than the second end 204 of the base plate, and fixedly attached to the base plate 200; each of the one or more reinforcing members 400 is placed onto the base plate 200 adjacent to the support post 100 and fixedly attached to the base plate 200 and to the support post 100; and the mounting plate 300 is fixedly attached to the top portion 102 of the support post 100. In the preferred embodiment, the support post 100 is welded to the base plate 200, the mounting plate 300 is welded to the support post 100, and each of the one or more reinforcing members 400 is welded to the base plate 200 and to the support post 100. Other means for fixedly attaching these components to each other are also contemplated by this invention.

In the embodiment in which there is an engagement aperture 220 of the base plate 200, the bottom portion 104 of the support post 100 is inserted into the engagement aperture 220 of the base plate 200 and then the support post 100 is fixedly attached to the base plate 200. In the embodiment in which there are reinforcement apertures 230, each of the one or more reinforcing members 400 is inserted into a reinforcement aperture 230 of the base plate 200 and then the reinforcing member 400 is fixedly attached to the base plate 200 and to the support post 100.

Figure 4:
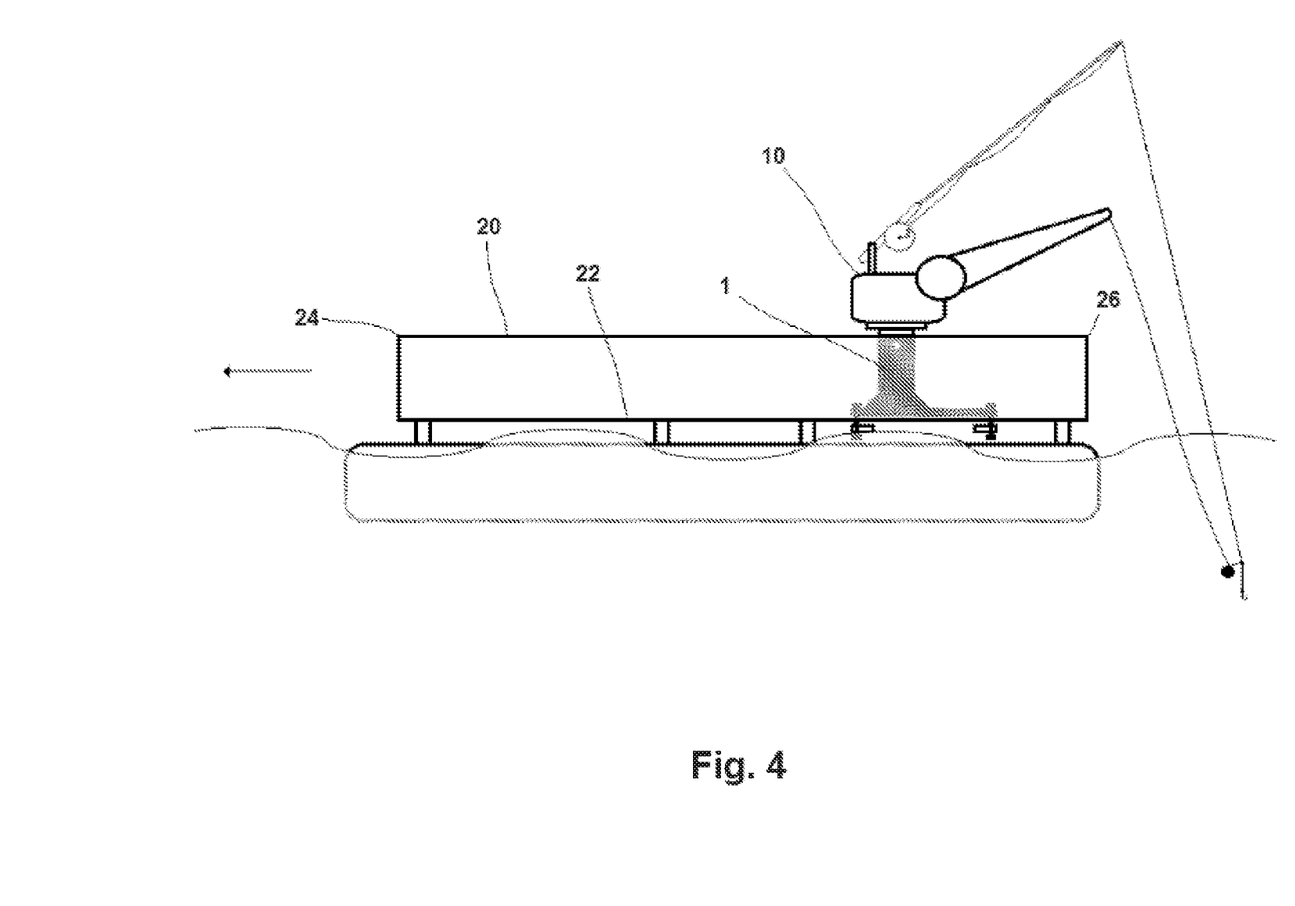
FIG. 4 is a plan side view of a stylized watercraft with the device of the present invention mounted thereon, with a downrigger mounted to the device; portions of the device of the present invention are shown in gray to depict details otherwise hidden by the side of the watercraft.

The pedestal 1 is preferably mounted to the deck 22 of the watercraft 20 in a manner resulting in the second portion 214 of the base plate 200 being oriented towards the portion of the watercraft 20 over which the downrigger 10 is deployed, typically the stern 26 of the watercraft 20, with the first portion 212 of the base plate 200 being oriented towards the opposite portion of the watercraft 20, typically the bow 24 of the watercraft 20. See FIG. 4. Alternatively, if the downrigger 10 is deployed over the side of the watercraft 20, the base plate 200 will be positioned with the second portion 214 of the base plate 200 oriented towards the side of the watercraft 20 over which the downrigger 10 is deployed, with the first portion 212 of the base plate 200 being oriented towards the opposite side of the watercraft 20. This orientation positions the pedestal 1 so that pivotal forces exerted on it by the downrigger 10 are spread over the greater area of the second portion 214 of the base plate 200, providing a more secure attachment of the pedestal 1 to the deck 22 of the watercraft 20.

To assist in securing the pedestal 1 to the deck 22 of the watercraft 20, one or more securing plates 500 may be used. Each securing plate 500 is substantially planar and constructed of a rigid durable material. It has a first end 502 and a second end 504, and comprises one or more securing apertures 520. In one embodiment, the securing plate 500 has a substantially rectangular shape. In other embodiments, the securing plate 500 may have an irregular shape. In the most preferred embodiment there are three securing plates 500. In the preferred embodiment, the securing plate 500 is constructed out of stainless steel. Other materials are also contemplated, such as aluminum, composites, steel, and the like. The securing plate 500 is placed in a substantially horizontal orientation below the deck 22 of the watercraft 20. See FIGS. 1, 3, and 4. The dimensions of the securing plate 500 may vary as practical, with a preferred range of lengths being between 1 inch and 6 inches, and the most preferred length being 2 inches. The preferred range of widths of the securing plate 500 is between ½ inch and 2 inches, and the most preferred width being 1 inches. The thickness of the securing plate 500 may vary as practical, with a preferred range of thicknesses of between $\frac{1}{8}^{th}$ inch and 1 inch, and the most preferred thickness being $\frac{1}{4}^{th}$ inch. See FIG. 2D.

Figure 2D:
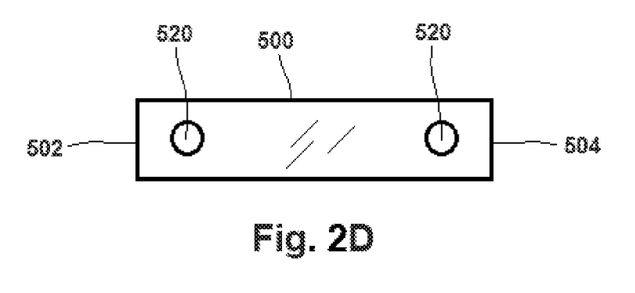
FIG. 2D is a plan top view of a securing plate of the embodiment of the device shown in FIG. 1.

Each of the one or more securing apertures 520 within each securing plate 500 passes completely through the securing plate 500, with at least one securing aperture 520 located proximate to the first end 502 of the securing plate 500 and at least one other securing aperture 520 located proximate to the second end 504 of the securing plate 500. In the most preferred embodiment each securing plate 500 has two securing apertures 520. Each securing aperture 520 of the securing plate 500 is suitably configured to align with an attachment aperture 240 of the base plate 200 and to accommodate an attachment fastener 600. Each attachment fastener 600 passes through one of the attachment apertures 240 of the base plate 200, then through an aperture formed through the deck 22 of the watercraft 20, and then through one of the securing apertures 520, and is affixed to the securing plate 500. In one embodiment, each of the attachment fasteners 600 is comprised of a bolt 602 and a nut 604, though the use of other types of fasteners is also contemplated.

Modifications and variations can be made to the disclosed embodiments of the present invention without departing from the subject or spirit of the invention.

We claim:
1. A pedestal for supporting a downrigger on a deck of a watercraft comprising
   a support post,
   a base plate,
   a mounting plate, and
   one or more reinforcing members;

wherein the support post is elongate and constructed of a rigid durable material and comprises a top portion, a bottom portion, and an internal void;

the base plate is substantially planar and constructed of a rigid durable material and comprises
- a first end and a second end,
- a first portion, said first portion located proximate to the first end of the base plate and having a length,
- a second portion, said second portion located proximate to the second end of the base plate and having a length, wherein the length of the second portion of the base plate is greater than the length of the first portion of the base plate, and
- a plurality of attachment apertures passing completely through said base plate and suitably configured to accommodate attachment fasteners which attach the base plate to the deck of the watercraft, with at least one said attachment aperture located on the first portion of the base plate and at least one said attachment aperture located on the second portion of the base plate;

the mounting plate is substantially planar and constructed of a rigid durable material and comprises
- a plurality of mounting apertures passing completely through said mounting plate and suitably configured to accommodate mounting fasteners which attach the mounting plate to the downrigger; and each of the one or more reinforcing members is substantially planar and constructed of a rigid durable material;

whereby the bottom portion of the support post is placed onto the base plate and fixedly attached to the base plate, each of the one or more reinforcing members is placed onto the base plate such that at least a portion of each said reinforcing member is located adjacent to the support post and each said reinforcing member is fixedly attached to the base plate and to the support post, and the mounting plate is fixedly attached to the top portion of the support post.

2. The pedestal for supporting a downrigger of claim 1 wherein the support post has a substantially circular cross section.

3. The pedestal for supporting a downrigger of claim 1 wherein the support post has a substantially rectangular cross section.

4. The pedestal for supporting a downrigger of claim 1 wherein the base plate is substantially rectangular.

5. The pedestal for supporting a downrigger of claim 1 wherein the base plate is substantially ovoid.

6. The pedestal for supporting a downrigger of claim 1 wherein the mounting plate is substantially rectangular.

7. The pedestal for supporting a downrigger of claim 1 wherein the mounting plate is substantially ovoid.

8. The pedestal for supporting a downrigger of claim 1 wherein the mounting plate is substantially circular.

9. The pedestal for supporting a downrigger of claim 1 wherein each of the one or more reinforcing members has a first side and a second side oriented substantially perpendicular to the first side, with the first side being positioned adjacent to the support post and the second side being positioned adjacent to the base plate.

10. The pedestal for supporting a downrigger of claim 9 wherein each of the one or more reinforcing members is substantially triangular in shape, each said reinforcing member having a first side and a second side oriented substantially perpendicular to the first side, with the first side being positioned adjacent to the support post and the second side being adjacent to the base plate.

11. The pedestal for supporting a downrigger of claim 1 wherein there are two reinforcing members, with one reinforcing member located on the first portion of the base plate and one reinforcing member located on the second portion of the base plate.

12. The pedestal for supporting a downrigger of claim 1 wherein there are six attachment apertures located on the base plate, with four attachment apertures located on the first portion of the base plate and two attachment apertures located on the second portion of the base plate.

13. The pedestal for supporting a downrigger of claim 1 wherein there are four mounting apertures located on the mounting plate.

14. The pedestal for supporting a downrigger of claim 1 wherein the support post further comprises an access aperture passing completely through said support post to provide access to the internal void of the support post.

15. The pedestal for supporting a downrigger of claim 14 wherein the access aperture of the support post is located on the top portion of the support post.

16. The pedestal for supporting a downrigger of claim 1 further comprising one or more securing plates,
- each said securing plate being substantially planar and constructed of a rigid durable material and comprising
  - a first end and a second end, and
  - a plurality of securing apertures passing completely through said securing plate, with at least one securing aperture located proximate to the first end of the securing plate and at least one other securing aperture located proximate to the second end of the securing plate, with each said securing aperture suitably configured to align with an attachment aperture of the base plate and to accommodate an attachment fastener;
- wherein each said attachment fastener passes through one of the attachment apertures of the base plate, an aperture formed through the deck of the watercraft, and through one of the securing apertures of one of the securing plates and is affixed to said securing plate.

17. The pedestal for supporting a downrigger of claim 16 wherein each of the one or more securing plates is rectangular.

18. The pedestal for supporting a downrigger of claim 16 wherein there are three securing plates.

19. The pedestal for supporting a downrigger of claim 16 wherein each of the one or more securing mounting plates is constructed of stainless steel.

20. The pedestal for supporting a downrigger of claim 16 wherein each of the attachment fasteners is comprised of a bolt and a nut.

21. The pedestal for supporting a downrigger of claim 1 wherein the support post, the base plate, the mounting plate, and the one or more reinforcing members are constructed of stainless steel.

22. The pedestal for supporting a downrigger of claim 21 wherein the support post is welded to the base plate, the mounting plate is welded to the support post, and each of the one or more reinforcing members is welded to the base plate and to the support post.

23. The pedestal for supporting a downrigger of claim 1 wherein the support post, the base plate, the mounting plate, and the one or more reinforcing members are constructed of aluminum.

24. The pedestal for supporting a downrigger of claim 1 wherein the pedestal is mounted to the deck of the watercraft in a manner resulting in the first portion of the base plate being oriented towards a bow of the watercraft and the second portion of the base plate being oriented towards a stern of the watercraft.

25. The pedestal for supporting a downrigger of claim 1 wherein the base plate further comprises
   an engagement aperture passing through said base plate and suitably configured to accommodate the bottom portion of the support post, said engagement aperture located closer to the first end of the base plate than to the second end of the base plate,
   whereby the bottom portion of the support post is inserted into engagement aperture of the base plate and fixedly attached to the base plate.

26. The pedestal for supporting a downrigger of claim 25 wherein the base plate further comprises
   one or more reinforcement apertures passing through said base plate and suitably configured to accommodate the one or more reinforcing members, each said reinforcement aperture located proximate to the engagement aperture, with at least one reinforcement aperture located on the second portion of the base plate,
   whereby each of the one or more reinforcing members is inserted into a reinforcement aperture of the base plate such that at least a portion of each said reinforcing member is located adjacent to the support post and each said reinforcing member is fixedly attached to the base plate and to the support post.

27. The pedestal for supporting a downrigger of claim 26 wherein each of the one or more reinforcement apertures is an elongate slot oriented substantially perpendicular to the engagement aperture of the base plate.

28. The pedestal for supporting a downrigger of claim 27 wherein each of the one or more reinforcing members has a first side and a second side oriented substantially perpendicular to the first side, with the first side being positioned adjacent to the support post and the second side inserted into one of the reinforcement apertures.

29. The pedestal for supporting a downrigger of claim 27 wherein each of the one or more reinforcing members is substantially triangular in shape, each said reinforcing member having a first side and a second side oriented substantially perpendicular to the first side, with the first side being positioned adjacent to the support post and the second side inserted into one of the reinforcement apertures.

30. The pedestal for supporting a downrigger of claim 26 wherein there are two reinforcing members and two reinforcement apertures, with one reinforcement aperture located on the first portion of the base plate and one reinforcement aperture located on the second portion of the base plate.

31. The pedestal for supporting a downrigger of claim 25 wherein the support post has a substantially circular cross section and the engagement aperture of the base plate is substantially circular, whereby an inside diameter of the engagement aperture is just slightly larger than an outside diameter of the support post such that the engagement aperture snugly accommodates the support post.

32. The pedestal for supporting a downrigger of claim 25 wherein the support post has a substantially rectangular cross section and the engagement aperture of the base plate is substantially rectangular, whereby inside dimensions of the engagement aperture snugly accommodate outside dimensions of the support post.

33. The pedestal for supporting a downrigger of claim 1 wherein the base plate further comprises
   one or more reinforcement apertures passing through said base plate and suitably configured to accommodate the one or more reinforcing members, each said reinforcement aperture located proximate to the location of the support post, with at least one reinforcement aperture located on the second portion of the base plate,
   whereby each of the one or more reinforcing members is inserted into a reinforcement aperture of the base plate such that at least a portion of each said reinforcing member is located adjacent to the support post and each said reinforcing member is fixedly attached to the base plate and to the support post.

34. A pedestal for supporting a downrigger on a deck of a watercraft comprising
   a support post,
   a base plate,
   a mounting plate,
   two reinforcing members, and
   three securing plates;
   wherein the support post is elongate and constructed of a rigid durable material and comprises a top portion, a bottom portion, and an internal void, and said support post has a substantially circular cross section, and the support post further comprises an access aperture passing completely through said support post to provide access to the internal void of the support post, with the access aperture of the support post located on the top portion of the support post;
   the base plate is substantially planar and substantially rectangular and constructed of a rigid durable material and comprises
      a first end and a second end,
      a first portion, said first portion located proximate to the first end of the base plate and having a length,
      a second portion, said second portion located proximate to the second end of the base plate and having a length, wherein the length of the second portion of the base plate is greater than the length of the first portion of the base plate, and
      six attachment apertures passing completely through said base plate and suitably configured to accommodate attachment fasteners which attach the base plate to the deck of the watercraft, with four attachment apertures located on the first portion of the base plate and two attachment apertures located on the second portion of the base plate;
   the mounting plate is substantially planar and substantially square and constructed of a rigid durable material and comprises
      four mounting apertures passing completely through said mounting plate and suitably configured to accommodate mounting fasteners which attach the mounting plate to the downrigger;
   each of the two reinforcing members is substantially planar and substantially triangular and constructed of a rigid durable material, with each said reinforcing member having a first side and a second side oriented substantially perpendicular to the first side, with the first side being positioned adjacent to the support post and the second side positioned adjacent to the base plate; and
   each of the three securing plate is substantially planar and substantially rectangular and comprises
      a first end and a second end and two securing apertures passing completely through said securing plate, with one securing aperture located proximate to the first end of the securing plate and one other securing aperture located proximate to the second end of the securing plate, with each said securing aperture suitably configured to align with an attachment aperture of the base plate and to accommodate an attachment fastener, wherein each said attachment fastener is comprised of a bolt and a nut, with said bolt passing through one of the attachment apertures of the base plate, an aperture formed through the deck of the watercraft, and through one of the securing apertures of one of the securing plates, and said nut is attached to said bolt;

wherein the support post, the base plate, the mounting plate, the two reinforcing members, and the three securing plates are constructed of stainless steel, the bottom portion of the support post is placed onto the base plate nearer to the first end of the base plate than the second end of the base plate and welded to the base plate, each of the two reinforcing members is placed onto the base plate such that at least a portion of each said reinforcing member is located adjacent to the support post and each said reinforcing member is welded to the base plate and welded to the support post, and the mounting plate is welded to the top portion of the support post.

* * * * *